United States Patent [19]
Wren

[11] 3,811,743
[45] May 21, 1974

[54] ROLLER BEARING LUBRICATION
[75] Inventor: Frederick James Wren, Northampton, England
[73] Assignee: The Timken Company, Canton, Ohio
[22] Filed: June 8, 1972
[21] Appl. No.: 261,057

[30] Foreign Application Priority Data
June 16, 1971 Great Britain.................... 28322/71

[52] U.S. Cl. .............................................. 308/187
[51] Int. Cl. ............................................. F16c 1/24
[58] Field of Search ............ 308/187, 212, 213, 214

[56] References Cited
UNITED STATES PATENTS
3,628,835  12/1971  Cornish............................... 308/187
2,747,945  5/1956   Fulton................................. 308/187
2,217,801  10/1940  Katcher............................... 308/187

Primary Examiner—Charles J. Myhre
Assistant Examiner—R. H. Lazarus
Attorney, Agent, or Firm—Gravely, Lieder & Woodruff

[57] ABSTRACT

The invention relates to the lubrication of tapered roller bearings operating at high speed. Lubricant is fed to the roller-end/thrust rib interface through holes formed in the cone which communicate between the large diameter end face of the cone and the intersection of the cone race and thrust rib. The lubricant is supplied, externally of the shaft on which the bearing is mounted, to the openings of the lubricating holes in the large diameter end of the cone. For this purpose this end of the cone may be formed with a gutter which defines a space opening radially inwards and to which lubricant is fed either directly or by centrifugal force, the lip of the gutter extending inwardly to a diameter which is less than the diameter of a circle circumscribing the openings of the lubricating holes. In another embodiment the large diameter end of the cup may be provided with an enclosure member having a radially inner end portion positioned adjacent the circle circumscribing the openings of the lubricating holes which directs lubricant passing through the bearing into the openings.

17 Claims, 10 Drawing Figures

ROLLER BEARING LUBRICATION

BACKGROUND OF THE INVENTION

This invention relates to tapered roller bearings and, more particularly to the provision of means for ensuring efficient lubrication during high speed inner ring rotation.

Roller type bearings, with few exceptions, rely for their effective utilization on being lubricated by oil or grease. According to the conditions in which a roller bearing is used so the decision is made to use either an oil or a grease, and indeed to decide the specific qualities of the oil or grease.

For instance, rolling bearings which in their working conditions rotate at high speed are lightly loaded, generally require an optimum supply of a substantially low-viscosity lubricant in order to avoid unwanted heating due to lubricant shear and churning.

However, when rolling bearings are driven at very high speeds centrifugal and windage effects tend to upset efficient lubrication by throwing off lubricant before it gains entrance to the bearing or by causing lubricant within the bearing to by-pass certain areas, so leading to bearing malfunction.

An instance of this can be related in respect of a conventional tapered roller bearing which at high speed rotation can be adequately lubricated by means well known in this technological field. However, when this self-same bearing is accelerated in rotation to a condition where, under the influence of centrifugal force, lubricant within the bearing exhausts by the easiest radial route, certain areas within the bearing may receive inadequate lubrication.

The present invention seeks to correct this state of affairs, and indeed to turn otherwise unwanted centrifugal forces to good account in the lubrication of tapered roller bearings whenever the inner ring rotates at a speed sufficient to generate effective centrifugal forces within the lubricant.

A conventional tapered roller bearing may be described as consisting of an outer ring or cup with a tapered inner surface, separated from a co-axial inner ring or cone with a tapered outer surface and having a thrust rib at the larger diameter end of the tapered outer surface. Occupying the space between the cup and the cone is a plurality of tapered rollers usually separated one from the other and retained on the cone by a cage member, the larger end face of the rollers being adapted to slide on the thrust rib at the larger diameter end of the cone whilst rotating.

It is necessary to ensure that there is efficient lubrication at the sliding surfaces on the roller end face and the thrust rib, but in the position at which these surfaces are normally located in the conventional tapered roller bearing there is a danger of their receiving insufficient lubricant when the cone and rollers rotate at such a speed as to cause substantially all of the lubricant to exit from the bearing by the shortest route under the influence of centrifugal force.

SUMMARY OF THE INVENTION

It is an object therefore of this invention to provide an improved design of a tapered roller bearing which will ensure adequate lubrication at the roller-end/thrust rib interface.

It is a further object of this invention to provide such adequate lubrication whilst the bearing cone is rotating at speed which generate forces sufficient to centrifuge the lubricant present in, and entering the bearing.

It is another object of this invention to employ such centrifugal forces to direct lubricant to the roller-end/thrust rib interface.

According to this invention in the improved bearing the cone is provided with one or more lubricating holes which provide communication between the large diameter end face of the cone and the intersection of the cone race and the thrust rib at the large diameter end of the race, and means is provided for directing lubricant to the openings of the holes in the large diameter end-face of the cone.

In one form of the improved bearing of this invention the large end face of the cone is formed or provided with a gutter which defines an annular space opening radially inwardly to which lubricant is supplied, the lip of the gutter extending radially inwardly to a diameter which is less than the diameter of the circle circumscribing the holes in the large end face, so that during rotation of the cone, oil is captured in the gutter under the influence of centrifugal force and is directed into the lubricating holes.

The gutter may be constituted by an L-shaped annular ring which is secured on the thrust rib at the large diameter end of the cone, or by extending the thrust rib axially outwardly from the large diameter end face of the cone and forming this with an annular undercut portion.

To assist the gutter to capture oil, a conical surface may be provided on the shaft next to the large end face of the cone so that any oil which might alight on this surface during rotation will tend to climb the slope until it meets the cone face and then to centrifuge into the gutter and so into the lubricating holes.

DESCRIPTION OF THE DRAWINGS

Some embodiments of the improved bearing of this invention will now be described by way of example with reference to the accompanying drawings, in which.

DETAILED DESCRIPTION

Figure 1:
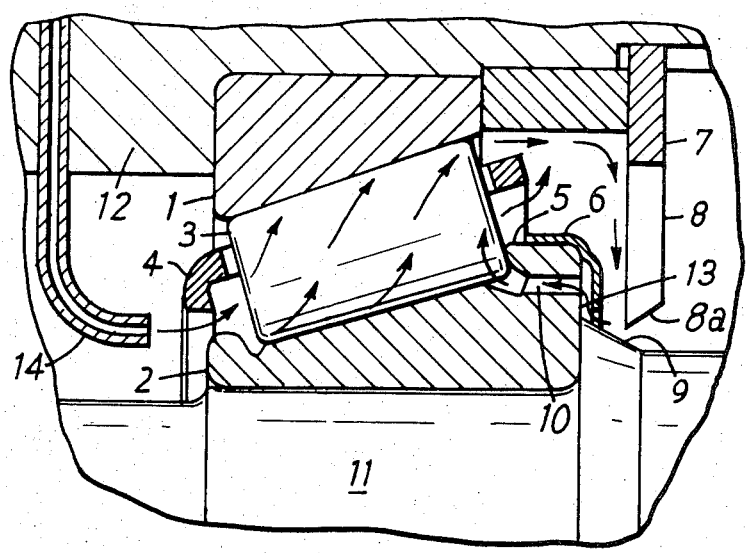
FIG. 1 shows a partial section of one embodiment of a bearing arrangement according to the invention.
Figure 2:
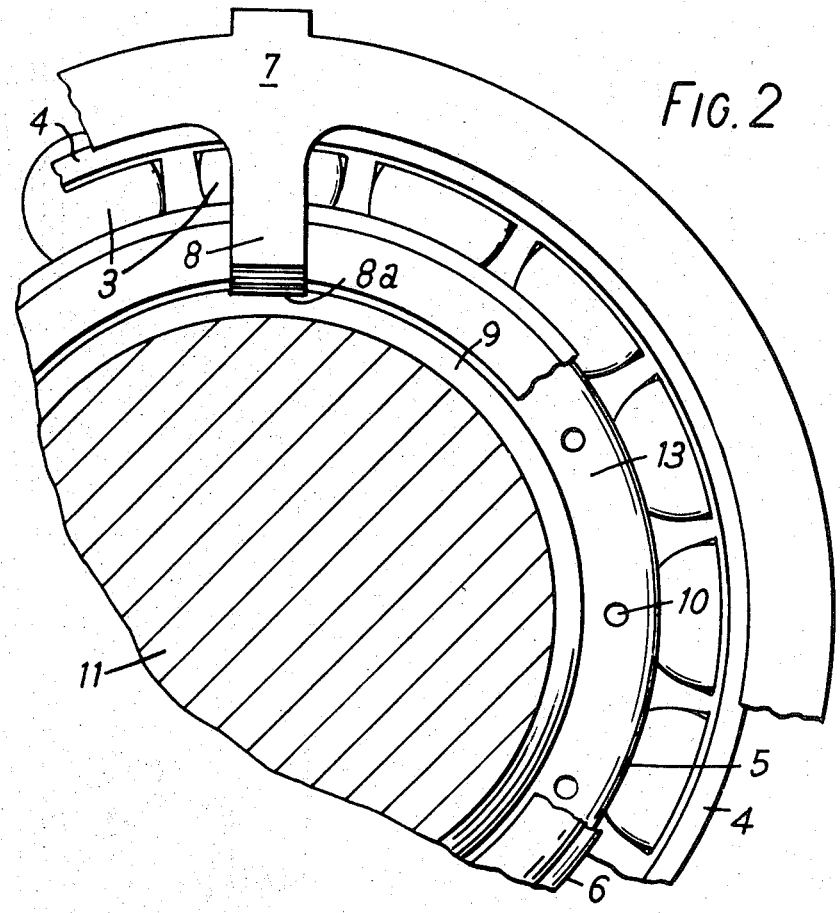
FIG. 2 shows an end view, partially broken away, of the bearing arrangement of FIG. 1.

The tapered roller bearing of FIGS. 1 and 2 is composed of a cup 1, a cone 2, and a plurality of rollers 3 arranged therebetween, the rollers being spaced and retained on the cone by a cage 4. The bearing cone 2 is mounted on a shaft 11 and the cup 1 is housed in a housing 12. An L-shaped annular gutter 6 is secured on the cone thrust rib 5 and stands away from the large end face 13 of the cone sufficiently to allow oil to accumulate in the space provided and so to find its way through a plurality of lubricating holes 10 which extend between the intersection of the race of the cone 2 and the thrust rib 5, and the large end face 13 of the cone. Under conditions of high speed rotation, oil emerging at pressure from a pipe 14 enters the bearing at the end remote from the thrust rib 5 and travels through the bearing in substantially helical fashion until it exits at the large diameter end of the cup 1. It will be noted at this point that the oil tends to avoid the cone thrust rib 5 and the large end face of the rollers 3, for which area there is a need for lubrication.

In order to be certain that oil reaches this area, it is conducted from its exit at the large diameter end of the cup 1 to a barrier 7 which has a radially inwardly directed finger 8 ending in a bevelled edge 8a situated close to a conical portion 9 of shaft 11. A proportion of the oil reaching the barrier 7 is conducted down the finger 8 — which is situated uppermost in the housing — until it drops onto the rotating conical portion 9 of the shaft 11 from which it is rapidly conducted to the gutter 6 and so through the lubricating holes 10 to lubricate the roller-end/thrust rib interface, i.e., the area otherwise avoided by the oil from pipe 14.

Figure 3:
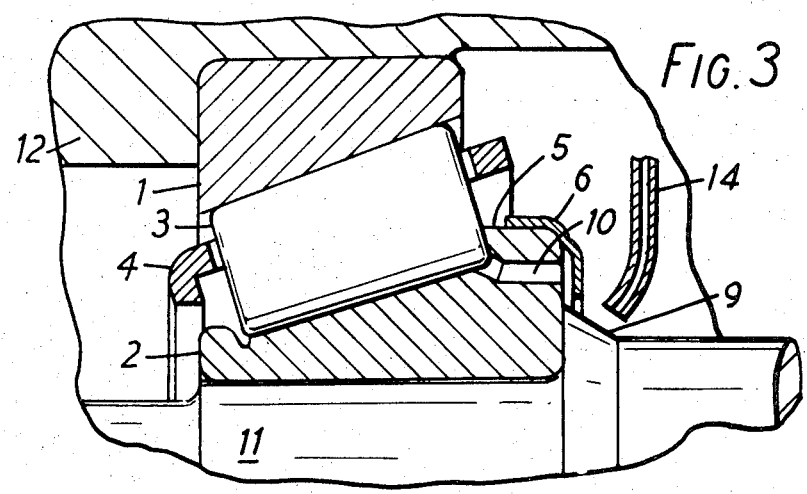
FIG. 3 shows a partial section of another embodiment.

FIG. 3 shows a tapered roller bearing mounted on a rotating shaft 11 and arranged in a housing 12. Oil emerging at pressure from a pipe 14 onto a conical portion 9 of shaft 11 is rapidly conducted into the gutter 6 by centrifugal effects, and then through the lubricating holes 10 to lubricate the roller-end/thrust rib interface. The gutter 6 extends outwardly beyond those ends of the holes 10 which open into it so that a quantity of oil accumulates in the gutter 6 through the effects of the centrifugal force. The addition of more oil to this accumulated oil at any point causes the oil to overflow into all of the holes 10 at the same time so that the oil is distributed evenly to the holes 10. The remainder of the bearing movement which is mainly rolling in character is lubricated by oil droplets or mist generated by the high speed rotation of the bearing, or by additional sources of oil.

Figure 4:
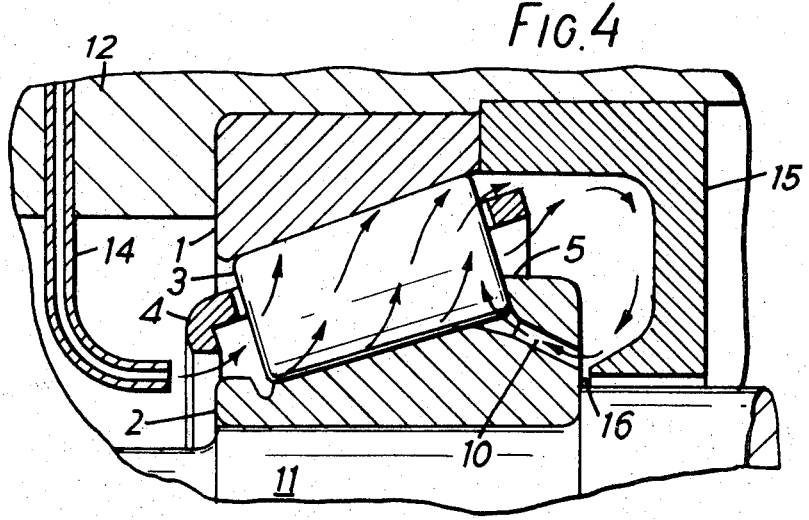
FIG. 4 shows a partial section of a further embodiment.

FIG. 4 illustrates a tapered roller bearing mounted between a housing 12 and a rotating shaft 11. Oil emerging at pressure from a pipe 14 enters the bearing at the end remote from the cone thrust rib 5, then taking a substantially helical path exits from the bearing at the large diameter end of the cup 1 against which a shaped enclosure member 15 abuts. The oil exhausting from the cup travels along the inner wall of the enclosure member 15 and a proportion of it is induced to cross the gap 16 into the lubricating holes 10, which being radially outwardly inclined, conduct the oil by centrifugal action to the interface at the roller-end and thrust rib 5. It will be noted that in this construction no L-shaped gutter member is required.

Figure 5:
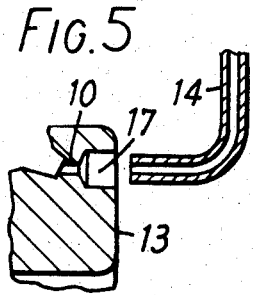
FIG. 5 shows a scrap section showing a method of directing oil into the lubricating holes.
Figure 6:
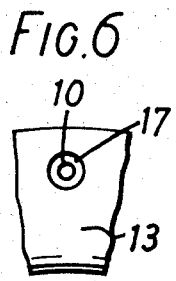
FIG. 6 shows a partial end view of FIG. 5.

FIGS. 5 and 6 are scrap section and partial end views of a cone in which the lubricating holes 10 in the large end face 13 of the cone are counterbored at 17 so that oil emerging at pressure from pipe 14 is driven through the holes 10 by the ram effect, to lubricate the roller ends and thrust rib.

Figure 7:
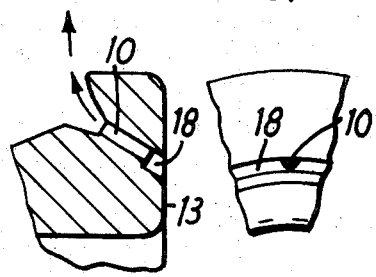
FIG. 7 shows a scrap section showing a modified method of directing oil into the lubricating holes.
Figure 8:
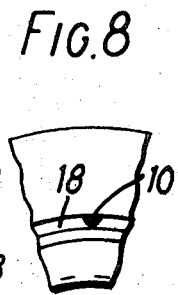
FIG. 8 shows a partial end view of FIG. 7.

FIGS. 7 and 8 are scrap section and partial end views of a cone in which the lubricating holes 10 are connected by an annular groove 18 formed in the large end face 13 of the cone. The holes 10 and groove 18 are radially outwardly inclined so that centrifugal force tends to lead oil into the groove 18 and through the holes 10 to the interface between the roller ends and the thrust rib.

Figure 9:
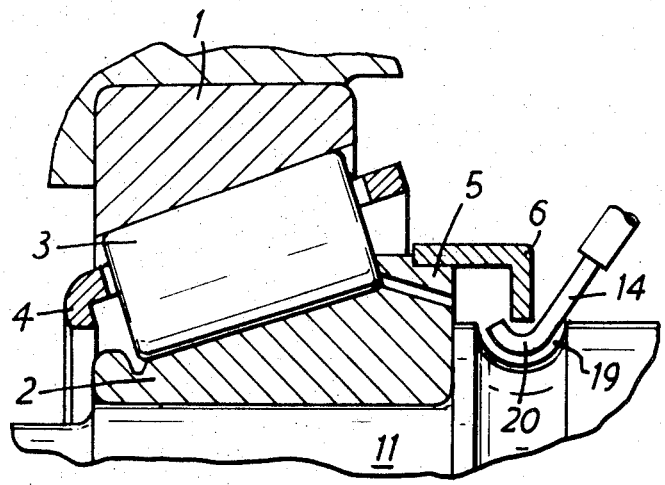
FIG. 9 shows a partial section of a further embodiment.

FIG. 9 shows a tapered roller bearing mounted on a shaft 11, and comprising a cup 1, a cone 2, and rollers 3 located on the cone by means of a cage 4. As in the embodiments of FIGS. 1, 2 and 3, an L-shaped gutter 6 is mounted on the thrust rib 5 of the cone 2. Oil under pressure is fed directly into the space between the gutter 6 and the large end face 13 of the cone 2 by means of a pipe 14 and the shaft 11 is provided with a groove 19 to accommodate the bend 20 at the end of the pipe. As in the previous embodiments, the cone 2 is provided with lubricating holes 10 communicating between the large end face of the cone and the intersection of the race of the cone and the thrust rib 5.

Figure 10:
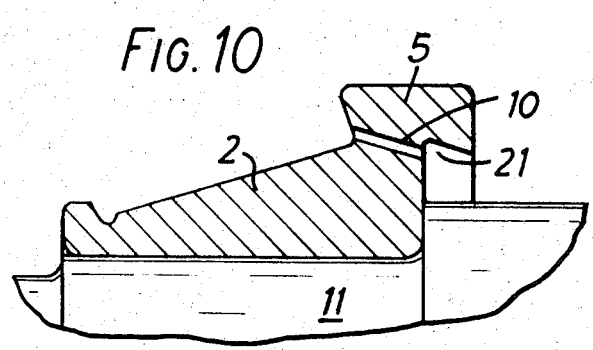
FIG. 10 shows a partial section of a modified form of cone.

FIG. 10 shows a modified form of cone which obviates the need for the gutter 6 of the bearings of FIGS. 1, 3 and 9. In this case the thrust rib 5 of the cone is extended axially outwardly away from the large end face 13 of the cone and formed with an undercut portion 21 which provides a space equivalent to the space between the gutter and large end face of the cone in the embodiments of FIGS. 1, 3 and 9.

It is an important feature of the bearing of this invention that effective lubrication of the roller-end/thrust rib interface can be obtained without the shaft, on which the bearing is mounted, having to be formed with a passage for the supply of lubricant to the bearing.

What is claimed is:

1. A tapered roller bearing assembly including a cup, a cone having a tapered raceway and a thrust rib at the large diameter end of the tapered raceway, and a plurality of rollers arranged between the cup and the cone, in which the cone is provided with one or more lubricating holes which provide communication between the large diameter end face of the cone and the intersection of the cone raceway and the thrust rib, and in which the large diameter end face of the cone is provided with a gutter defining an annular space opening radially inwards, the lip of the gutter extending radially inwardly to a diameter which is less than the diameter of a circle circumscribing the openings of the lubricating holes in the large diameter end face of the cone, and means is provided for directing lubricant to the annular space defined by the gutter so that the lubricant flows into the openings of the holes in the large diameter end face of the cone.

2. A bearing assembly as claimed in claim 1 in which lubricant is supplied directly to the gutter by means of a pipe.

3. A bearing assembly as claimed in claim 1 in which lubricant is supplied indirectly to the gutter by means of centrifugal force.

4. A bearing assembly as claimed in claim 3 in which the cone is mounted on a shaft having a conical portion abutting the large diameter end face of the cone and lubricant is delivered onto the conical portion up which it is moved by centrifugal action into the gutter.

5. A bearing assembly as claimed in claim 4 in which lubricant is delivered directly onto the conical portion through a pipe.

6 A bearing assembly as claimed in claim 4 in which the large diameter end of the cup is provided with a barrier having at least one finger directed radially inwardly towards the conical portion whereby lubricant passing through the bearing is directed onto the said conical portion.

7. A bearing assembly as claimed in claim 1 in which the gutter is constituted by an L-shaped annular ring secured on the thrust rib of the cone.

8. A bearing assembly as claimed in claim 1 in which the gutter is constituted by an annular undercut portion formed in an axial extension of the thrust rib of the cone.

9. A bearing assembly as claimed in claim 1 in which the lubricating holes in the cone are inclined radially outwardly from their openings in the large diameter end face of the cone whereby lubricant is carried through the holes by centrifugal force.

10. A bearing assembly as claimed in claim 9 in which the holes open into a radially outwardly inclined groove formed in the large diameter end face of the cone.

11. A tapered roller bearing comprising inner and outer races having opposed raceways, and rollers positioned between the races and engaged with the raceways thereof, the inner race having a rib located at the end of the raceway thereon and provided with an abutment face against which the ends of the rollers abut, the inner race also having an inwardly opening gutter at one end thereof with the inwardly opening portion of the gutter being located closer to the axis of rotation for the bearing than the abutment face, the inner race further having at least one passageway leading from the gutter to the vicinity of the abutment face on the rib so that lubricating oil which is introduced into the gutter will flow over the abutment face and prevent excessive friction from developing between that face and the ends of the rollers.

12. A bearing according to claim 11 wherein the gutter is on the rib.

13. A bearing according to claim 11 wherein the raceways and rollers are tapered and the rib is at the large diameter end of the tapered raceway for the inner race.

14. A bearing according to claim 12 wherein the gutter extends outwardly beyond the ends of the holes which open into it to enable a supply of lubricant to accumulate in the gutter so that the addition of anymore lubricant to the accumulated supply will cause the lubricant to overflow into the holes, whereby the lubricant will be evenly distributed to the holes.

15. A tapered roller bearing assembly for use with a rotatable shaft, said bearing assembly comprising: a cup having an inwardly presented raceway; tapered rollers having their tapered side faces against the cup raceway; a cone positioned within the cup and having an outwardly presented tapered raceway against which side faces of the tapered rollers are also positioned, the cone also having a bore through which the rotatable shaft extends such that the cone rotates with the shaft, the cone further having a thrust rib provided on one end with an end face through which thrust loading is transmitted from the shaft and on the other end with an abutment face located adjacent the large diameter end of the cone raceway with the large diameter ends of the tapered rollers being against the abutment face, the thrust rib having holes extending generally axially through it from the end face to the abutment face with the ends of the holes at the end face being located outwardly from the cone bore, means for supplying oil to the ends of the holes located at the end face of the thrust rib, said means being located outwardly from the cone bore in its entirety.

16. A tapered roller bearing according to claim 15 wherein the means for supplying oil to the holes includes an oil supply pipe directed generally toward small diameter ends of the rollers whereby the rotating rollers will pump the oil discharged therefrom through the space between the cup and cone and will discharge it from that space at the large diameter ends of the rollers, and a deflecting surface opposite the large diameter ends of the rollers for directing the oil discharged from between the cup and cone inwardly toward the ends of the holes at the end face of the thrust rib.

17. A tapered roller bearing assembly for use with a shaft which rotates about its axis at high speed through at least 360°, said bearing comprising: a cup having an inwardly presented raceway; a cone located within the cup and configured to receive a shaft such that the cone rotates with the shaft, the cone having an outwardly presented tapered raceway located opposite the cup raceway and a thrust rib at the large diameter end of the cone raceway, the cone being provided with oil holes having inlet and discharge ends with the discharge ends being at the surface of the thrust rib located adjacent to the cone raceway so that oil issuing therefrom will lubricate that surface; tapered rollers between the cup and the cone and having their tapered side faces along the raceways and their large diameter end faces against said surface of the thrust rib; means defining a cavity which rotates with and at the same speed as the cone and into which the inlet ends of the oil holes open, the cavity at least in part being closer to the axis of rotation than the discharge ends of the oil holes, the cavity further extending radially outwardly beyond the inlet ends of the oil holes to provide a space in which oil will accumulate due to centrifugal force on the oil, the surfaces defining said space being imperforate, whereby the addition of more oil to the accumulated supply in said space will cause the oil to overflow into the oil holes; and means for introducing oil into the cavity while the cone rotates with the shaft.

* * * * *